(12) United States Patent
Yasufuku et al.

(10) Patent No.: US 6,363,988 B1
(45) Date of Patent: Apr. 2, 2002

(54) MANUFACTURING APPARATUS FOR SINGLE-WIRE BEAD

(75) Inventors: Takuya Yasufuku; Yuichi Takeuchi, both of Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 09/567,265

(22) Filed: May 9, 2000

(30) Foreign Application Priority Data

Jun. 16, 1999 (JP) .......................................... 11-169647

(51) Int. Cl.[7] .............................................. B29D 30/48
(52) U.S. Cl. ........................ 156/396; 156/422; 156/460; 156/406.2
(58) Field of Search .............................. 156/111, 136, 156/442, 396, 406.2, 460

(56) References Cited

U.S. PATENT DOCUMENTS

| | | | | |
|---|---|---|---|---|
| 4,097,321 A | * | 6/1978 | Kelly et al. .................. | 156/136 |
| 4,354,892 A | * | 10/1982 | Tarantola et al. ............ | 156/136 |
| 5,100,497 A | * | 3/1992 | Moody et al. ............... | 156/460 |
| 5,215,613 A | * | 6/1993 | Shemenski et al. ......... | 156/136 |
| 5,632,836 A | * | 5/1997 | Verschoor et al. .......... | 156/111 |

* cited by examiner

*Primary Examiner*—Geoffrey L. Knable
(74) *Attorney, Agent, or Firm*—Birch, Stewart, Kolasch & Birch, LLP

(57) ABSTRACT

A manufacturing apparatus for single-wire bead provided with a winding device winding a wire onto a drum to form a formed bead, a thread winding device winding a thread to both ends of the wire on approximately same position in a circumferencial direction of the formed bead to form an intermediate bead, an apex fitting device fitting an apex to the intermediate bead to form a finished bead, and having a transfering device reciprocating between a first position and a second position. On the first position, the formed bead is taken out of the winding device and the intermediate bead is taken out of the thread winding device. And, on the second position, the formed bead is transferred to the thread winding device and the intermediate bead is transferred to the apex fitting device.

2 Claims, 16 Drawing Sheets

MANUFACTURING APPARATUS FOR SINGLE-WIRE BEAD

BACKGROUND OF THE INVENTION

1. Field of the Invention

This invention relates to a manufacturing apparatus for single-wire bead with which a finished bead is manufactured with one production line automatically.

2. Description of the Related Art

A conventional bead manufacturing apparatus is provided with each of a bead winding device and an apex fitting device independently. A bare bead is made by the winding device, the bare bead is stored in a stock lane as intermediate stock, production size of the bead is drawn out of the stock lane, and a finished bead is made by the apex fitting device.

In the conventional bead manufacturing apparatus, however, production cost is high because place for the stock lane for stocking the bare bead is necessary. And, additional labor and time are required for handling of the bead between the winding device and the stock lane, and between the stock lane and the apex fitting device, and this causes inconvenience. Further, defection of the fitting of the apex is generated by decreasing adhesiveness of the bare bead caused by the stock time.

It is therefore an object of the present invention, resolving the conventional problems, to provide a manufacturing apparatus for single-wire bead in which a winding device, a thread winding device, and an apex fitting device are linked by a transfering device, and a finished bead is automatically and efficiently manufactured with one production line.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 2A:
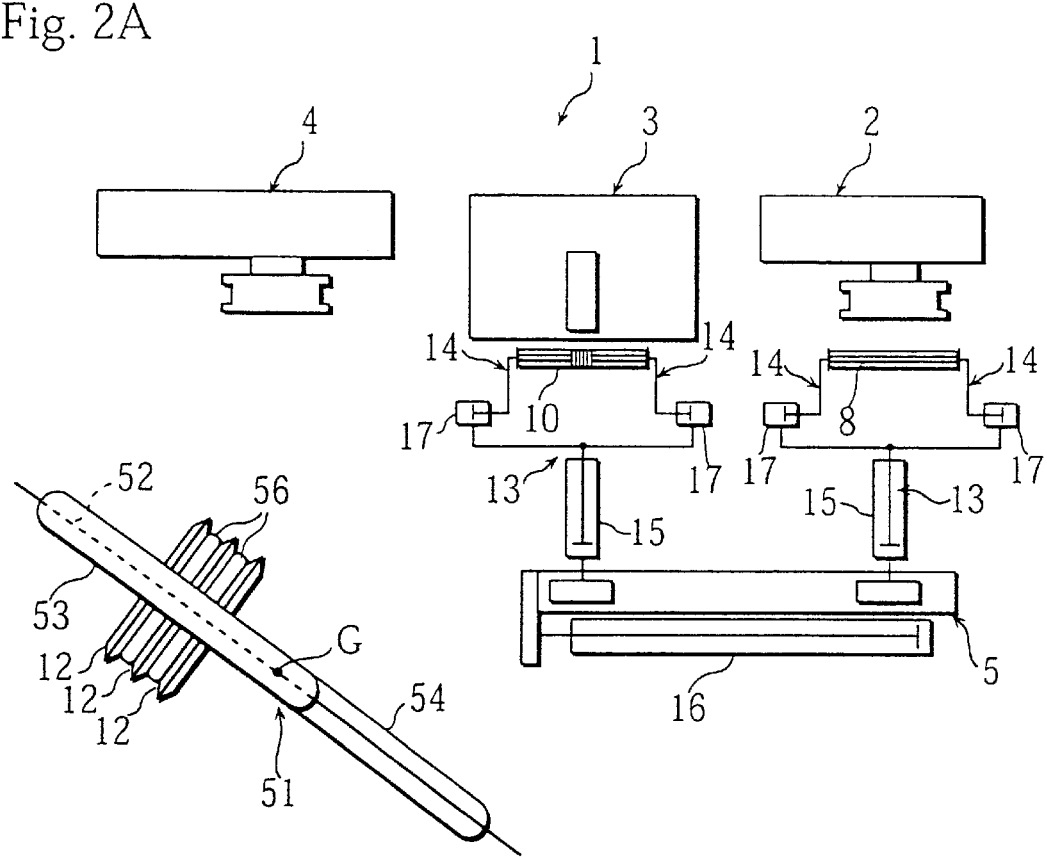
FIG. 2 is a second explanatory view of the present invention.
Figure 2B:
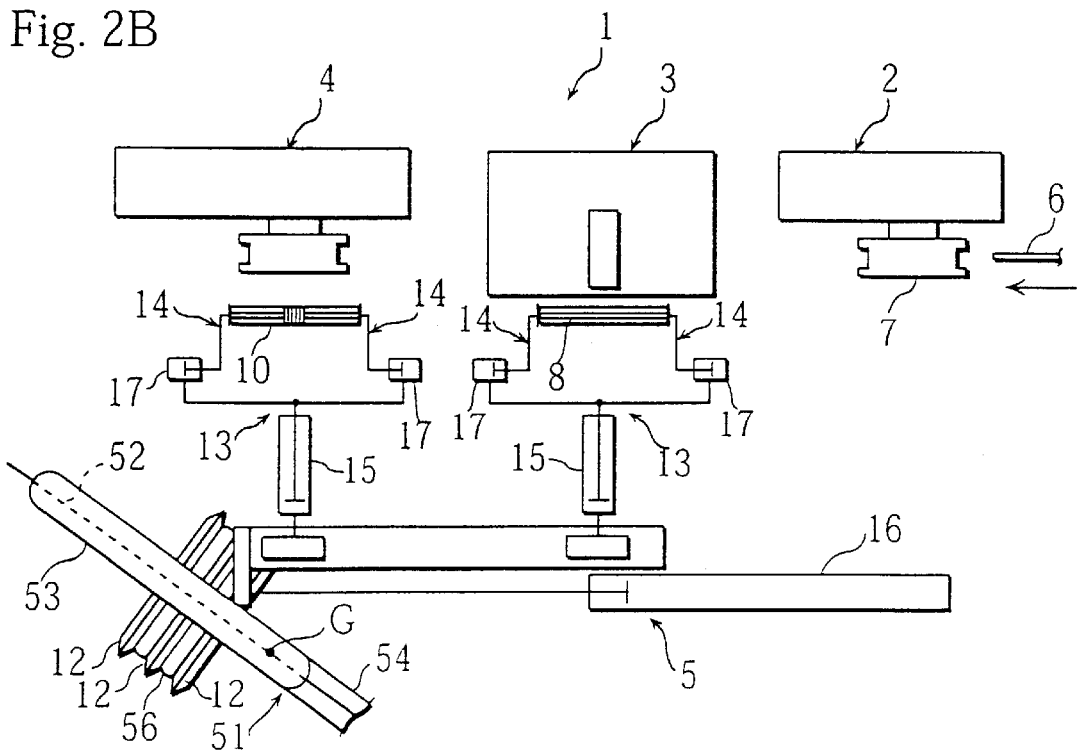
Figure 3A:
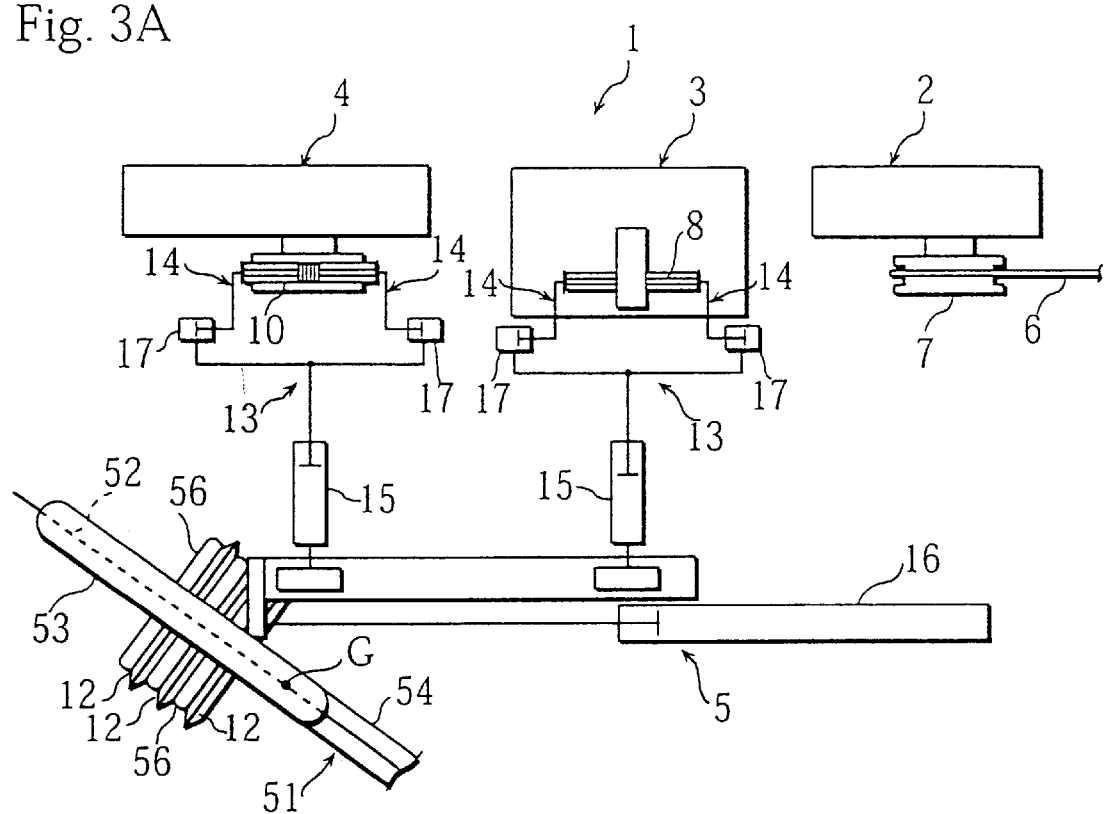
FIG. 3 is a third explanatory view of the present invention.
Figure 3B:
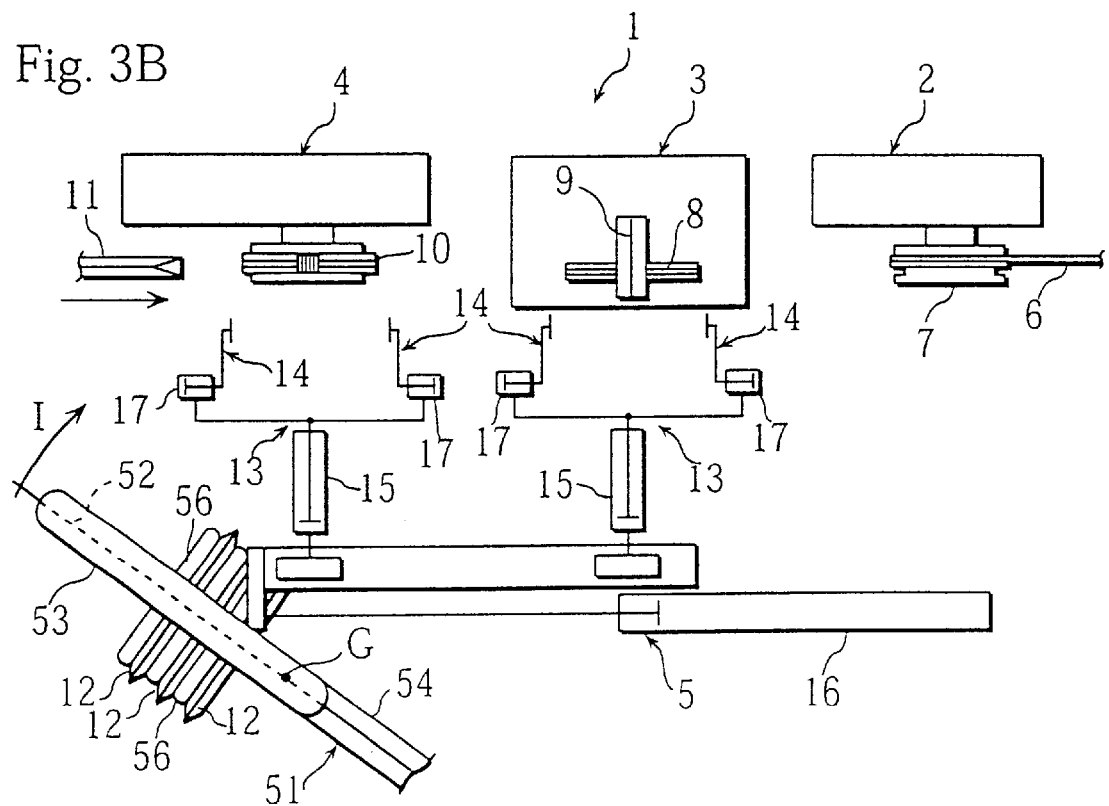

FIG. 1 through FIG. 3 show a preferred embodiment of a manufacturing apparatus for single-wire bead relating to the present invention. This apparatus 1 is provided with a winding device 2, a thread winding device 3, an apex fitting device 4, and a transfering device 5. And, it is preferable to provide a bead stock device 51.

The winding device 2 is a device for winding a (single) wire 6 around a drum 7 for plural times to form a formed bead. And, the thread winding device 3 is a device for winding and hitching a thread 9 to prevent both ends of the wire 6 of the formed bead 8 from falling off, and to form an intermediate bead 10. And, the apex fitting device 4 is a device for fitting an apex 11 to the intermediate bead 10 to form a finished bead 12. Further, the bead stock device 51 is a device for stocking the finished bead 12. And, the winding device 2, the thread winding device 3, and the apex fitting device 4 are disposed serially with the same intervals. And, the bead stock device 51 is disposed on a position in front of the apex fitting device 4.

The formed bead 8 is defined as that the wire 6 is wound around the drum 7 to form a core, the intermediate bead 10 is defined as that the thread 9 is round around the formed bead 8, and the finished bead 12 is defined that the apex 11 is attached to the intermediate bead 10.

And, the transfering device 5 is provided with a pair of transfering portions 13 each of which is disposed on a position facing the winding device 2 and a position facing the thread winding device 3, or a position facing the thread winding device 3 and a position facing the apex fitting device 4 respectively on an upstream side and a downstream side as to be parallel.

And, the transfering portion 13 is provided with plural (4 in the present invention as shown in FIG. 5) contact portions 14 which freely close to and part from the bead 8 and the bead 10 to hold the bead 8 and the bead 10.

Therefore, the transfering device 5 reciprocates between a first position and a second position, takes the formed bead 8 out of the winding device 2 and the intermediate bead 10 out of the thread winding device 3 on the first position, and transfers the formed bead 8 to the thread winding device 3 and the intermediate bead 10 to the apex fitting device 4 on the second position.

To describe concretely, as shown in FIG. 1, each of the transfering portions 13 is on a position facing the winding device 2 and a position facing the thread winding device 3 respectively on the first position, the transfering portion 13 on the upstream side is freely closed to and parted from the winding device 2, and the Add transfering portion 13 on the downstream side is freely closed to and parted from the thread winding device 3 by cylinders 15 of the transfering portions 13.

Further, as shown in FIG. 3, each of the transfering portions 13 is on a position facing the thread winding device 3 and a position facing the apex fitting device 4 respectively on the first position, the transfering portion 13 on the upstream side is freely closed to and parted from the thread winding device 3, and the transfering portion 13 on the downstream side is freely closed to and parted from the apex fitting device 4 by the cylinders 15 of the transfering portions 13.

And, as shown in FIG. 2, the transfering device 5 is constructed as to be freely reciprocate between the first position and the second position by a provided cylinder 16.

And, the contact portion 14 is freely closed to and parted from the bead 8 and the bead 10 by a cylinder 17. As shown in FIG. 5, plural contact portion 14 (4 in the present invention) are disposed on a circumference of the formed bead 8 (the intermediate bead 10 in FIG. 9) as to surround the formed bead 8 (the intermediate bead 10 in FIG. 9). Therefore, the plural contact portions 14 can freely contract and expand to hold and release the bead 8 and the bead 10.

Next, production of bead in the apparatus 1 is described. In the present invention, a single-wire bead is made, working time of the winding device and the apex fitting device 4 in one production process can be synchronized with a ratio of 1:1 because (different from a conventional tape bead) a bead is formed by winding a single wire around a drum for plural times.

Figure 1A:
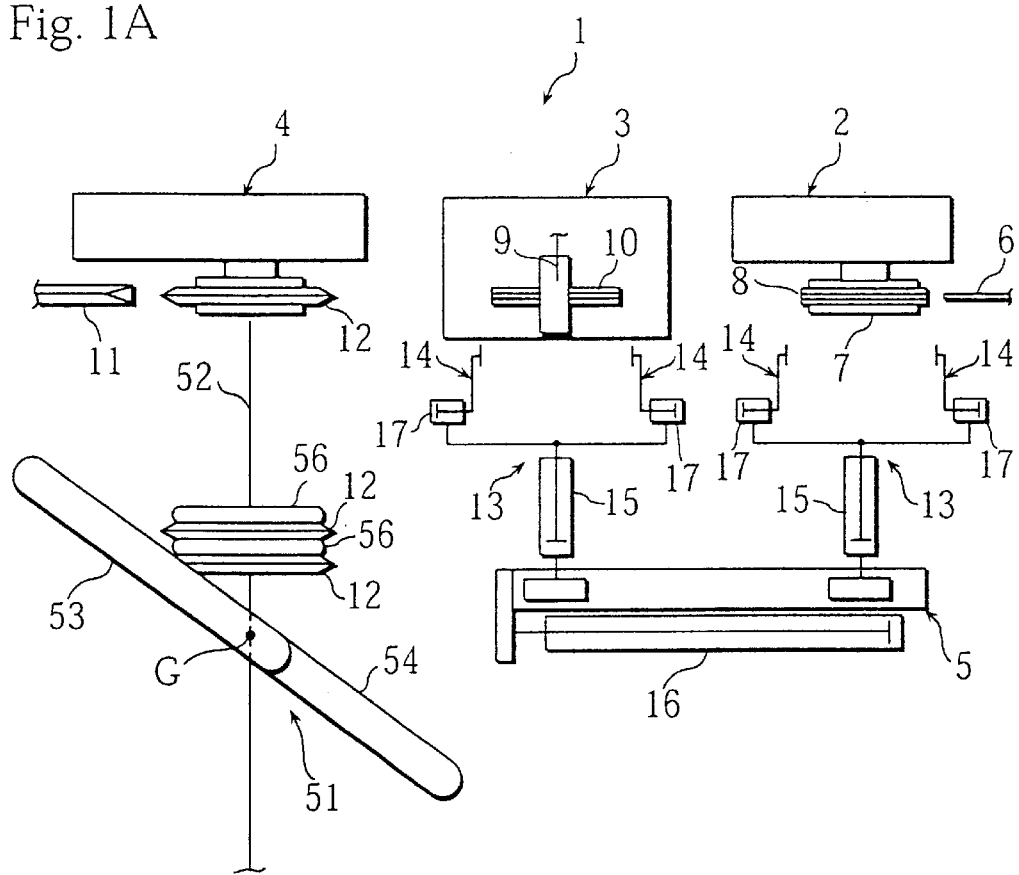
FIG. 1 is a first explanatory view showing a preferred embodiment of the present invention.

As shown in FIG. 1A, the formed bead 8 is formed by the winding device 2, the intermediate bead 10 is formed by the thread winding device 3, and the finished bead 12 is formed by the apex fitting device 4. And, the transfering device 5 is on the first position, and each of the transfering portions 13 are parted from the winding device 2 and the thread winding device 3. And, the contact portions 14 are expanded.

Figure 1B:
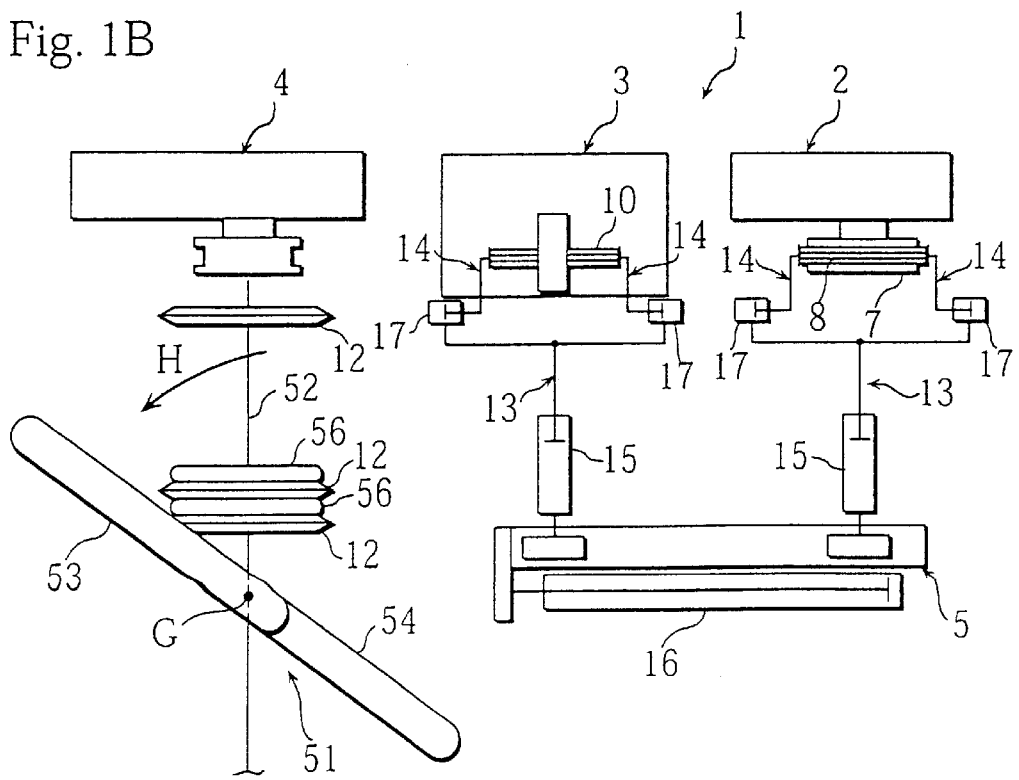

And, as shown in FIG. 1B, each of the transfering portions 13 closes to the winding device 2 and the thread winding device 3 respectively, the contact portions 14 are contracted to hold the bead 8 and the bead 10. And, the finished bead 12 is sent out of the apex fitting device 4 to a stock portion 52 of the bead stock device 51. And, the stock portion 52 turns in a direction of an arrow H around an axis G, and the finished bead 12 approaches a spacer supplying portion 53.

Then, as shown in FIG. 2A, the transfering portions 13, holding the bead 8 and the bead 10, part from the winding device 2 and the thread winding device 3 respectively, take the bead 8 out of the device 2 and the bead 10 out of the device 3, and the transfering device 5 is moved to the second position by the cylinder 16 as shown in FIG. 2B. And, the winding device 2 starts winding the wire 6 around the drum T.

And, as shown in FIG. 3A, the contact portions 14 expand and release the bead 8 and the bead 10, and the transfering portions 13 part from the thread winding device 3 and the apex fitting device 4 respectively. And, the thread winding device 3 starts winding the thread 9 around the formed bead 8, and the apex fitting device 4 starts fitting the apex 11 to the intermediate bead 10. And, the winding device 2 is successively winding the wire 6 around the drum 7.

And, the transfering device 5 is (as shown in FIG. 1A) moved to the first position by the cylinder 16, and the stock portion 52 turns in a direction of an arrow I around the axis G and proceeds to the position where the finished bead 12 is sent out. And, the bead 8 and the bead 10 are transferred and the finished bead 12 is made repeatedly.

Figure 4:
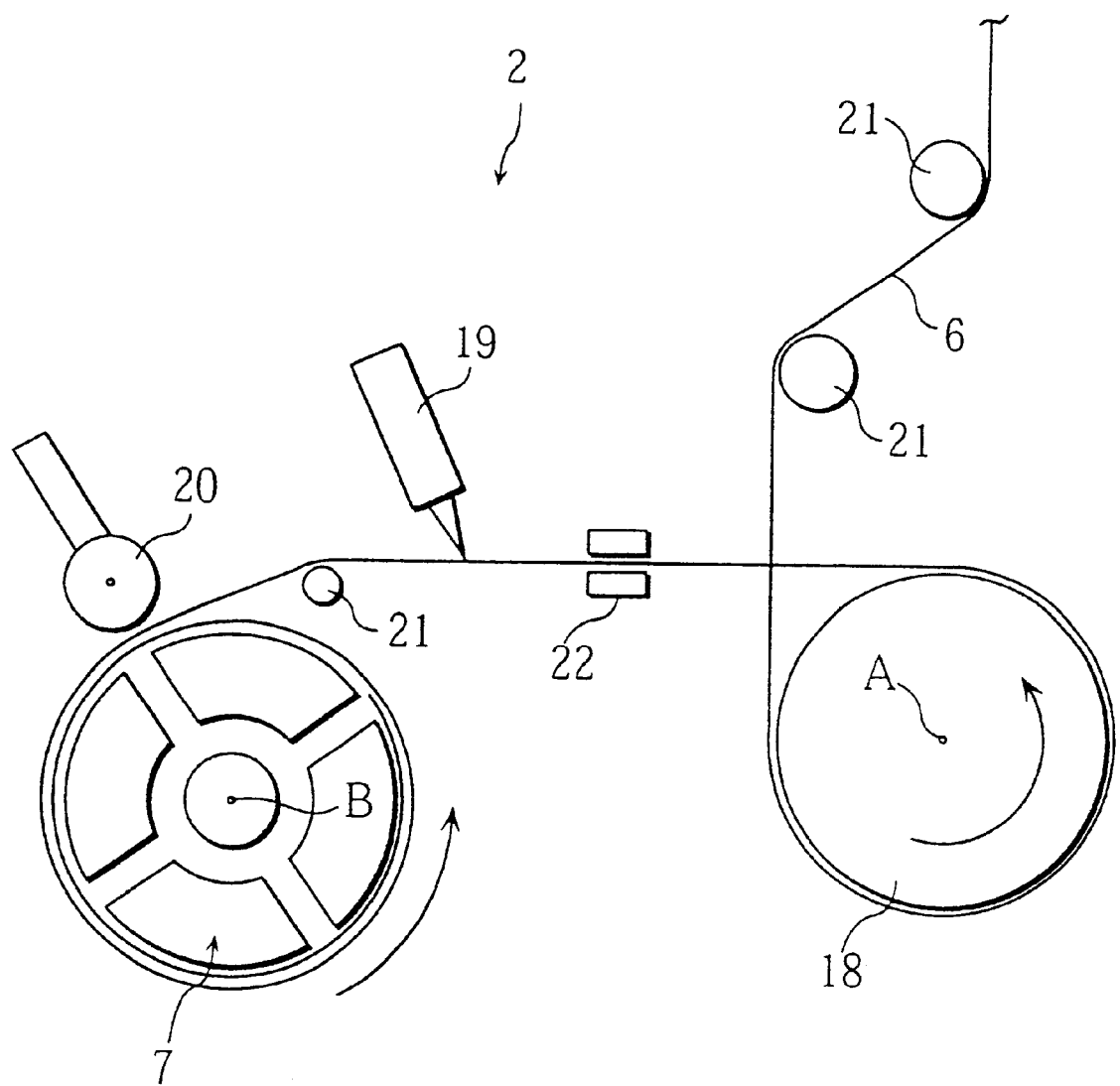
FIG. 4 is a first explanatory view of a winding device.
Figure 6A:
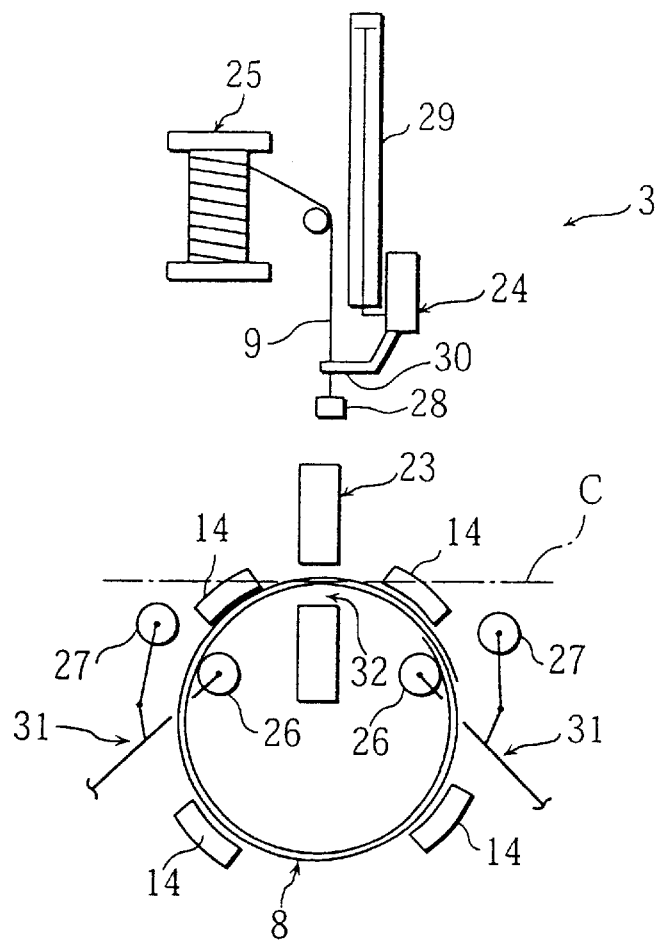
FIG. 6 is a first explanatory view of a thread winding device.
Figure 6B:
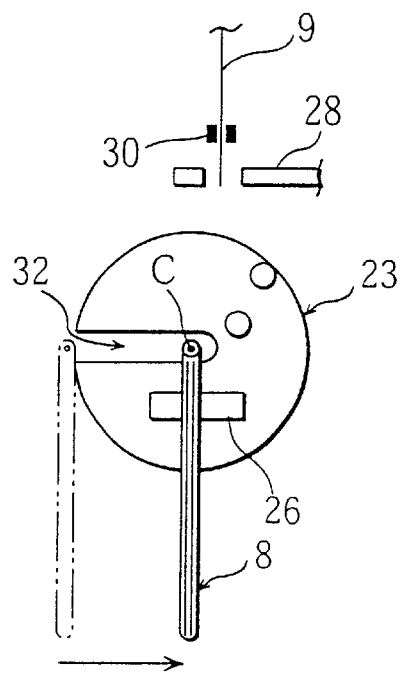

Next, the devices 2, 3, 4, and 15 are described in detail. First, the winding device 2 is described. The winding device 2, as shown in FIG. 4, is provided with the drum 7 composed of a four-piece former, a in FIG. 6, the thread winding device 3 is provided with a discoid rotating thread winding portion 23, a guiding portion 24, a thread portion 25, a fixing and cutting portion 28, and roller portions 31.

And, the rotating thread winding portion 23 is attached as to freely rotate around an axis C, and provided with a notched groove portion 32 toward the center portion (the axis C). And, the roller portion 31, having a driving roller 26 and a presser roller 27, is disposed on both sides of the rotating thread winding portion 23 in a direction of the axis C. And, the presser roller 27 is attached as to freely close to and part from the driving roller 26.

And, the formed bead 8 is transferred as described below (refer to FIG. 3). The formed bead 8 held by the contact portions 14 is guided to the center portion of the rotating thread winding portion 23 through the notched groove portion 32, and held by the driving rollers 26 from inside of the circumference of the formed bead 8 on a position corresponding to the center portion (the axis C). The thread 9 drawn from the thread portion 25 is held by a holding portion 30 of the guiding portion 24, and can be guided toward near to the center portion of the rotating thread winding portion 23 by a cylinder 29.

Figure 7A:
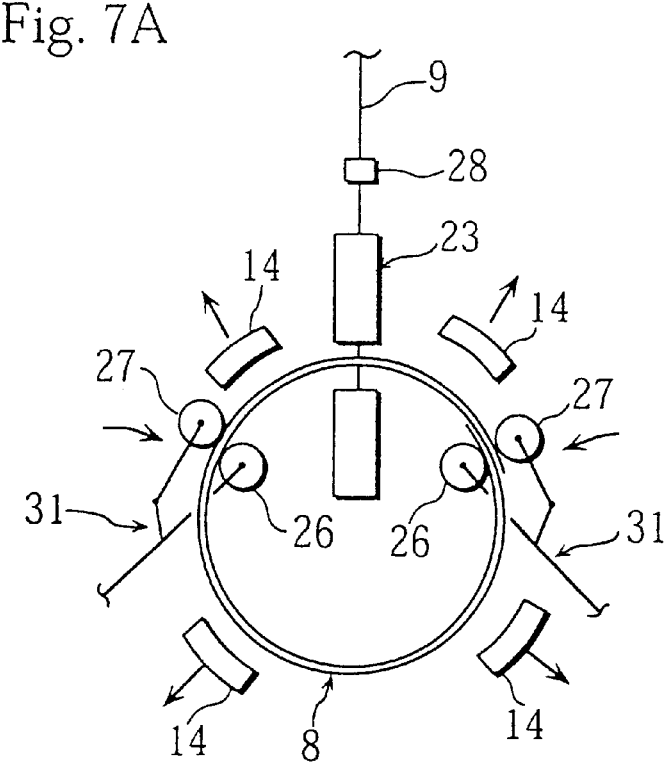
FIG. 7 is a second explanatory view of the thread winding device.
Figure 7B:
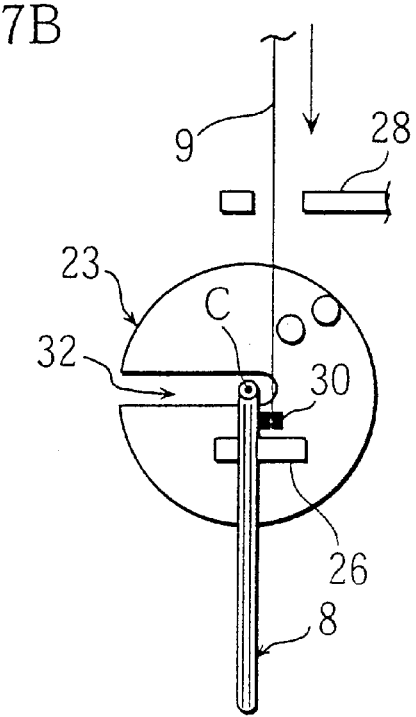

And, as shown in FIG. 7, the presser roller 27 comes close to the driving roller 26, the formed bead 8 is held by the presser roller 27 and the driving roller 26, and the contact portions 14 expand and release the formed bead 8 to finish the transfer. Then, the thread 9 is driving roller 18, a cutting portion 19, a presser roller 20, plural guiding rollers 21, and a chuck portion 22.

The wire 6 is fed to the drum 7 attached as to rotate around an axis B by the driving roller 18 attached as to rotate around an axis A, pressed to the drum 7 by the presser roller 20, and wound around the drum 7. And, the wire 6 is certainly guided by the guiding rollers 21.

After the winding of the wire 6 around the drum 7 for plural times, the wire 6 is fixed by the chuck 22, cut by the cutting portion 19, and the formed bead 8 is formed as shown in FIG. 5. And, both ends of the wire 6 are on the approximately same position in circumferential direction of the formed bead 8.

Figure 5A:
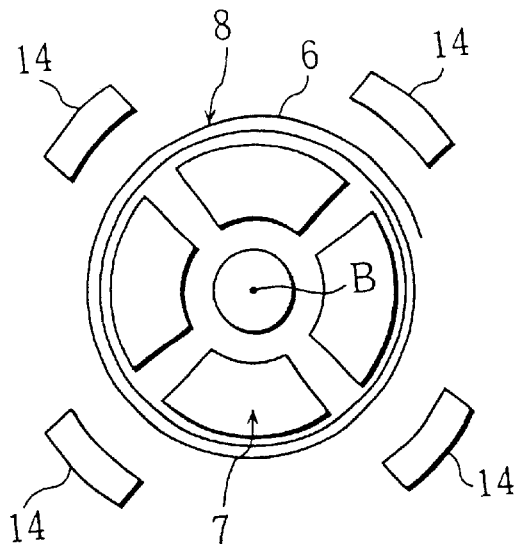
FIG. 5 is a second explanatory view of the winding device.
Figure 5B:
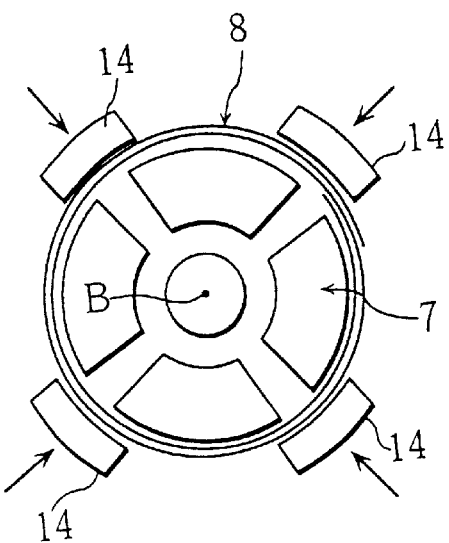
Figure 5C:
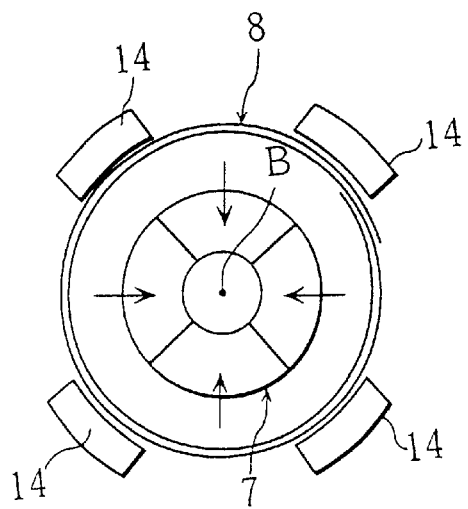

Next, the formed bead 8 is taken out (refer to FIG. 1). As shown in FIG. 5A, the expanded contact portions 14 are positioned outside on the circumference of the formed bead 8, and the contact portions 14 contract and hold the formed bead 8 as shown in FIG. 5B. And, as shown in FIG. 5C, the formed bead 8 is held and taken out by the contact portions 14 when the drum 7 contracts toward the axis B. Then, the drum 7 expands to a predetermined diameter, and the formed bead 8 is successively formed (refer to FIG. 4).

In this case, the drum 7 is composed of a four-piece former which freely expands and contracts in directions at right angles with the axis B.

Next, the thread winding device 3 is described in detail. As shown led near to the center portion inside the rotating thread winding portion 23.

Figure 8A:
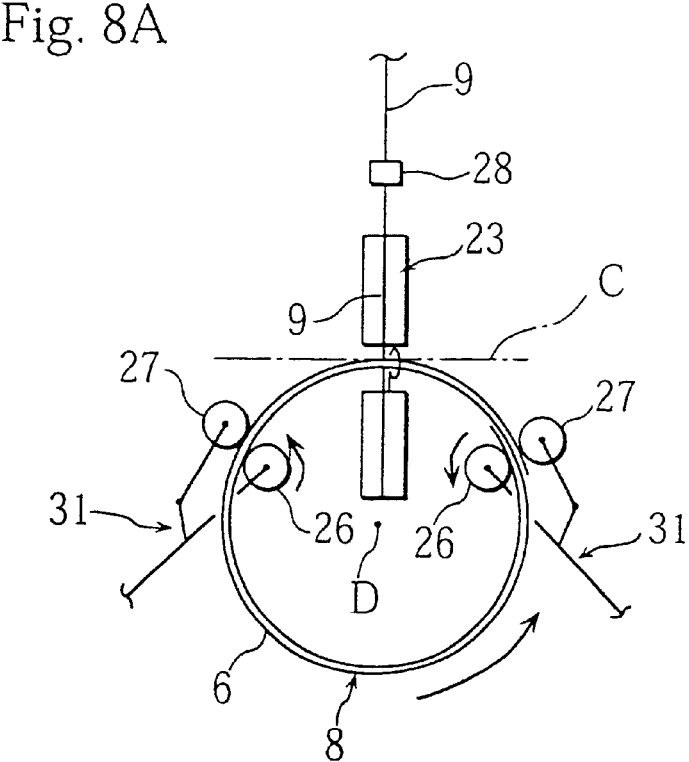
FIG. 8 is a third explanatory view of the thread winding device.
Figure 8B:
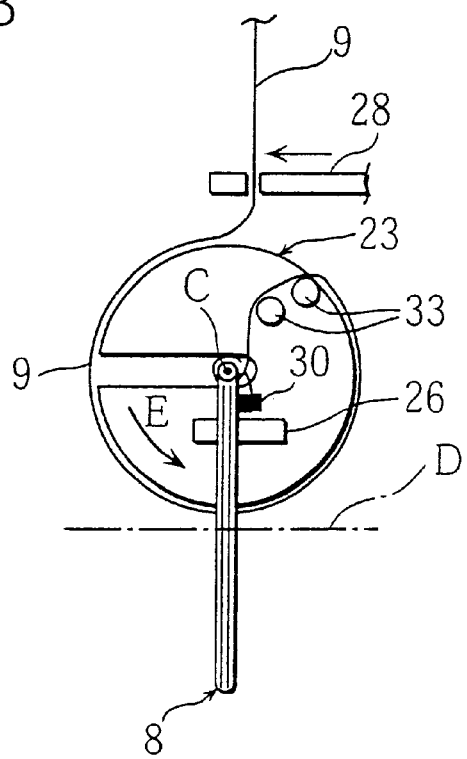

And, as shown in FIG. 8, the formed bead 8 is rotated around an axis D by rotation of the driving rollers 26. The formed bead is rotated to a predetermined position because a part including the both ends of the wire 6 is wound with a thread.

Then, the thread is wound on the formed bead 8 by the rotating thread winding portion 23 rotating around the axis C in a direction of an arrow E. To describe concretely, an end portion of the thread 9 inside the rotating thread winding portion 23 is fixed by the holding portion 30, the thread 9 is guided and wound around the formed bead 8 (the axis C) by plural guiding portions 33 inside the rotating thread winding portion 23 when the rotating thread winding portion 23 rotates. Further, in this case, the thread 9 is also guided onto the periphery of the rotating thread winding portion 23, and fixed and cut by the fixing and cutting portion 28 after required length of the thread 9 is guided.

Figure 9A:
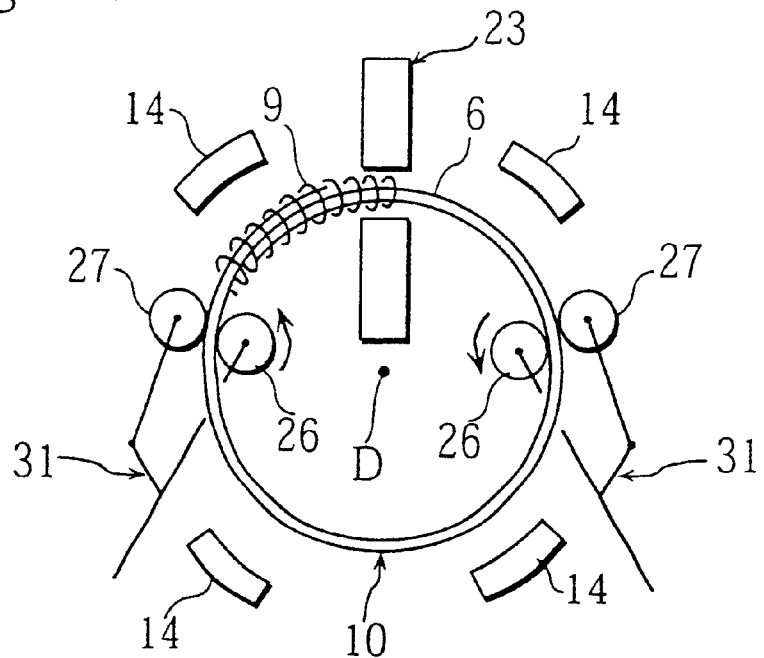
FIG. 9 is a fourth explanatory view of t he thread winding device.
Figure 9B:
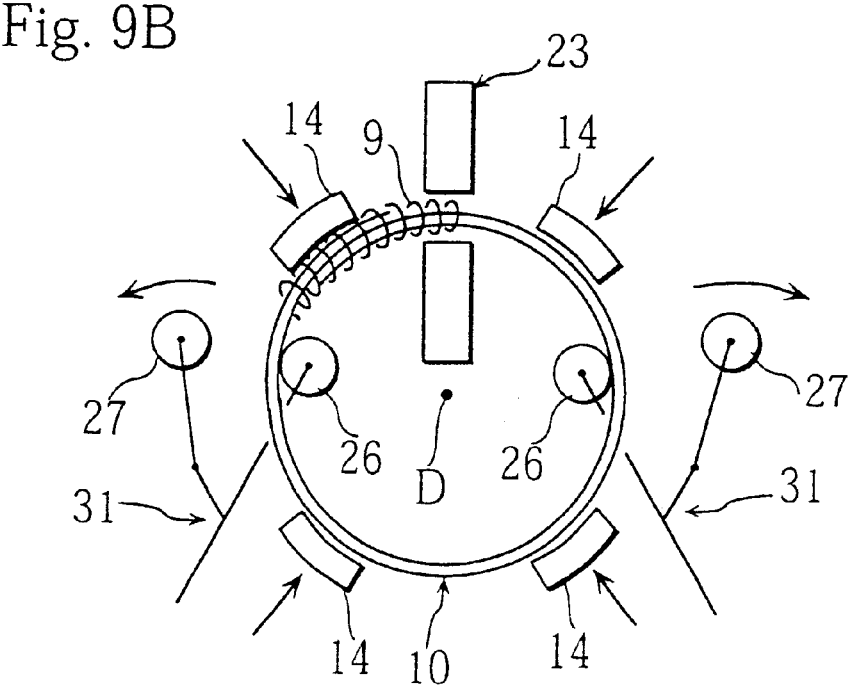

And, when the rotating thread winding portion 23 is rotating around the axis C, the formed bead 8 rotates around the axis D, the part including the both ends of the wire 6 is wound with the thread as shown in FIG. 9A, and the intermediate bead 10, in which the both ends of the wire 6 are fixed, is formed thereby. Then, the intermediate bead 10 is taken out. That is to say, as shown in FIG. 9B, the contact portions 14 hold the intermediate bead 10, the presser rollers 27 part from the driving rollers 26, and the intermediate bead 10 is taken out.

Next, the apex fitting device 4 is described in detail. As shown in FIG. 10, the apex fitting device 4 is provided with a drum 34 composed of a two-piece former, a cutting portion 35, and a presser roller 36.

The drum 34, attached as to rotate around an axis F, is composed of a two-piece former freely expands and contracts in a direction at right angles with the axis F. And, the drum 34 has plural (4 in the present invention) built-in release pins 38 which become protruding when the drum 34 contracts.

Figure 10A:
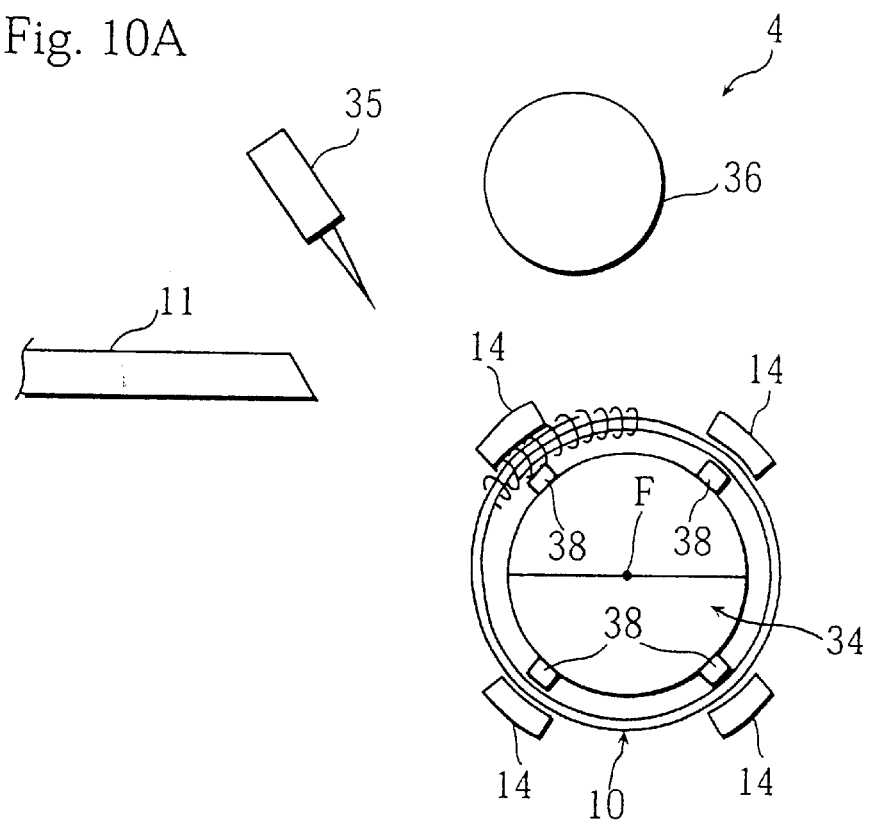
FIG. 10 is a first explanatory view of an apex fitting device.
Figure 10B:
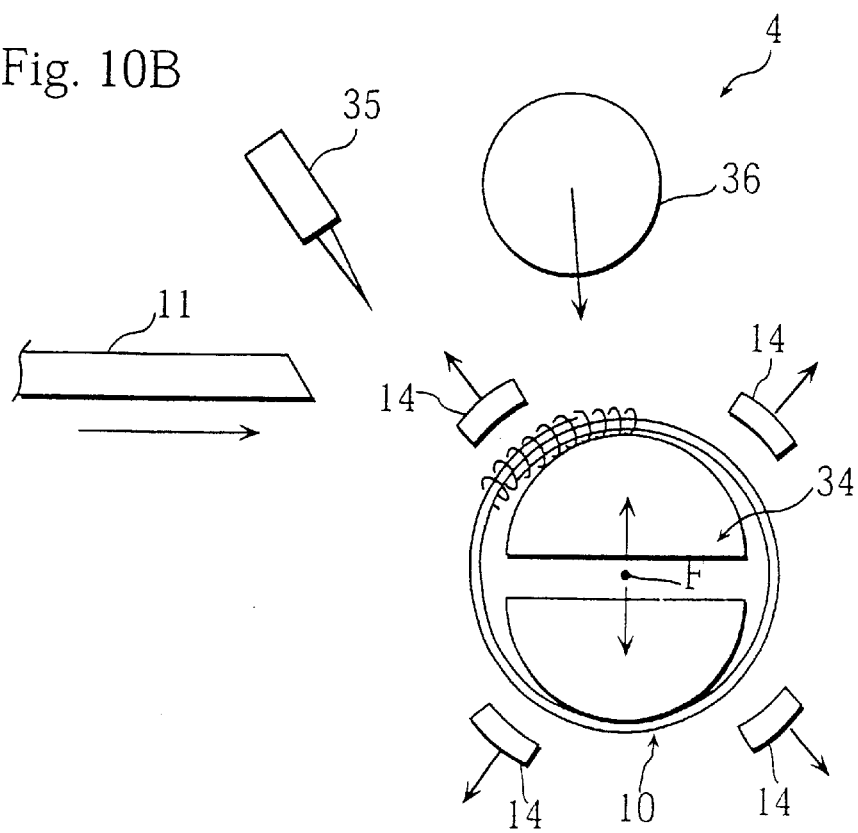

And, as shown in FIG. 10A, the intermediate bead 10 held by the contact portions 14 is led into the apex fitting device 4 as to surround the contracted drum 34. And, as shown in FIG. 10B, the drum 34 expands, the contact portions 14 release the intermediate bead 10, and the drum 34 holds the intermediate bead 10.

Figure 11A:
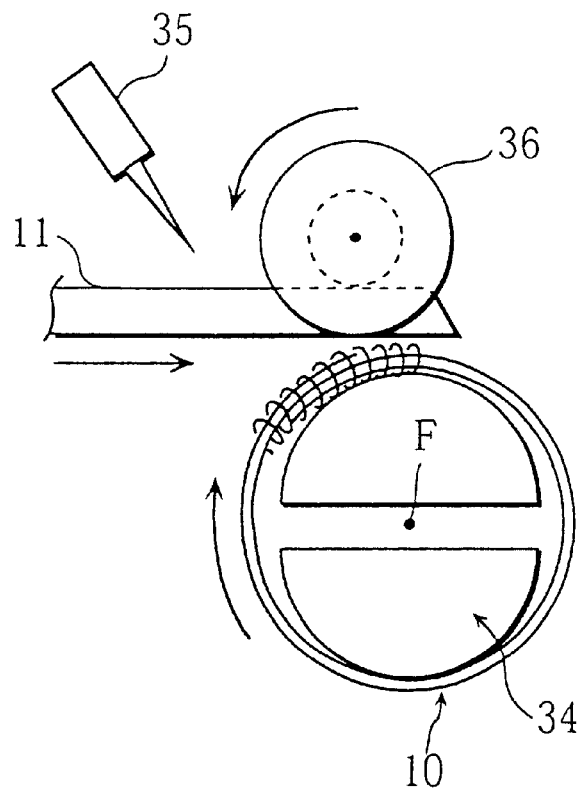
FIG. 11 is a second explanatory view of the apex fitting device.
Figure 11B:
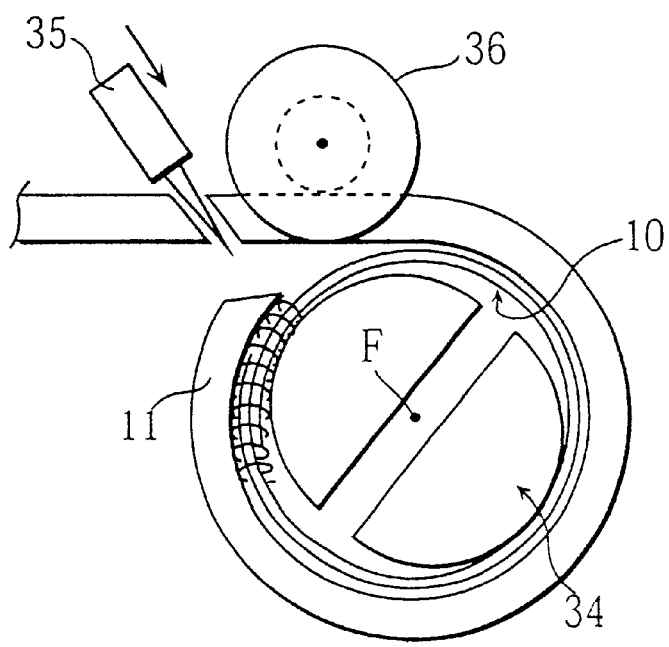

Then, as shown in FIG. 11A, the apex 11 is sent out onto the intermediate bead 10, pressed onto the intermediate bead 10 by the presser roller 36, and fitted to the intermediate bead 10 by rotation of the drum 34 in a direction of an arrow indicated above the presser roller 36. And, as shown in FIG. 11B, the apex 11 is cut by the cutting portion 35 with a predetermined length (length of periphery of the intermediate bead 10). Although the cross-sectional configuration of the apex 11 is triangle in the present invention, another apex having a circular cross-sectional configuration can be fitted by changing the presser roller 36.

Figure 12:
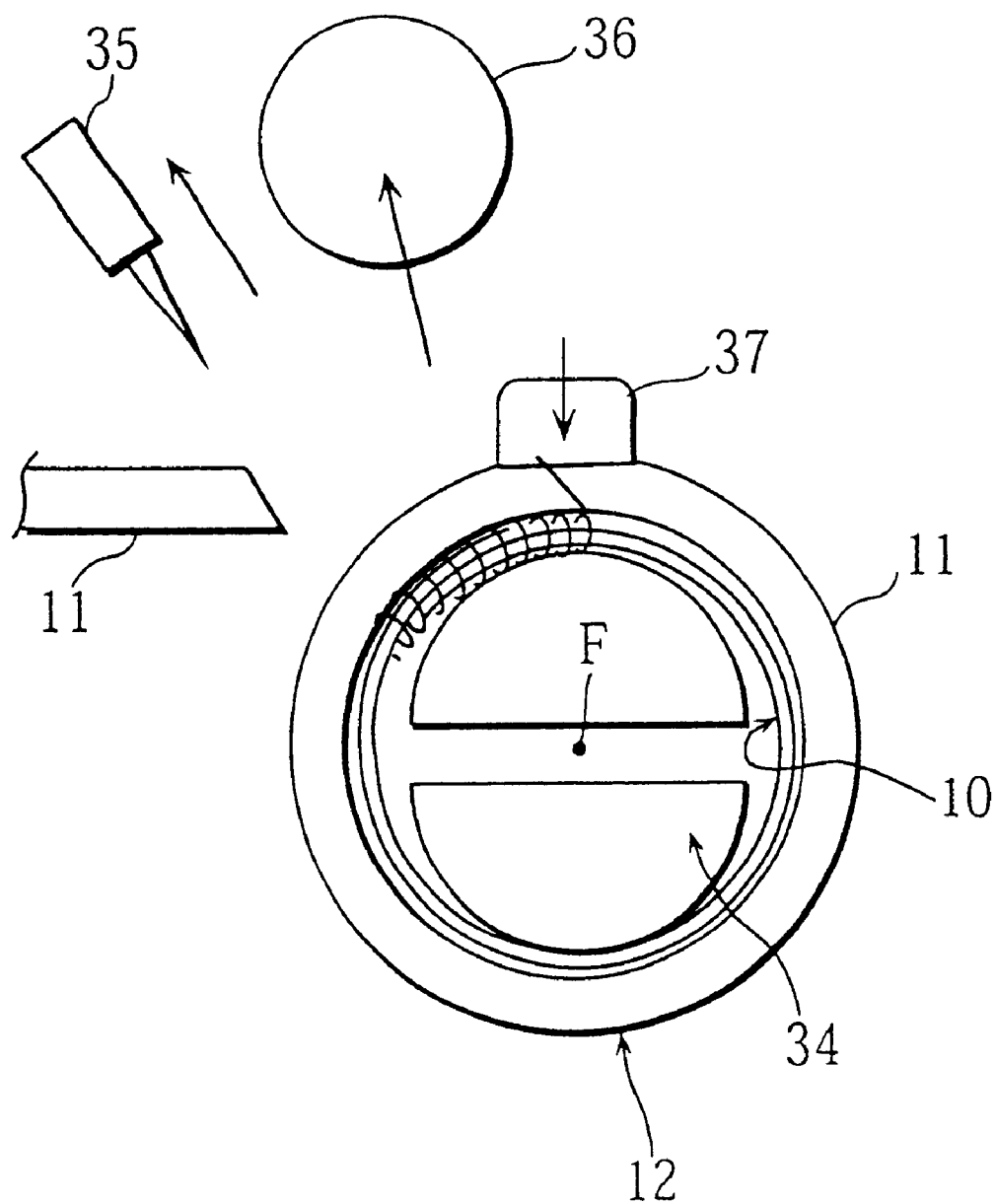
FIG. 12 is a third explanatory view of the apex fitting device.

And, as shown in FIG. 12, the presser roller 36 parts from the fitted apex 11, a pressing portion 37 presses downward both ends of the apex 11 to connect the both ends, and the finished bead 12 is formed thereby.

Figure 13A:
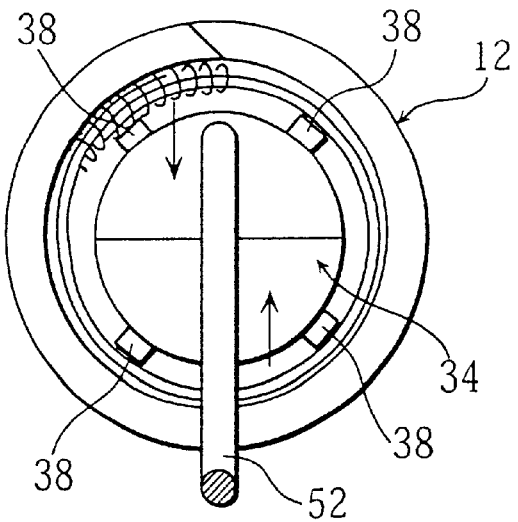
FIG. 13 is a fourth explanatory view of the apex fitting device.

Then, as shown in FIG. 13A, the stock portion 52 of the bead stock device 51 (refer to FIG. 1) is situated in front of the drum 34, the drum 34 contracts, and the release pins 38 become protruding. And, as shown in FIG. 13B, the finished bead 12, sliding on inclinations of the release pins 38, is released from the drum 34 to the stock portion 52.

Figure 14:
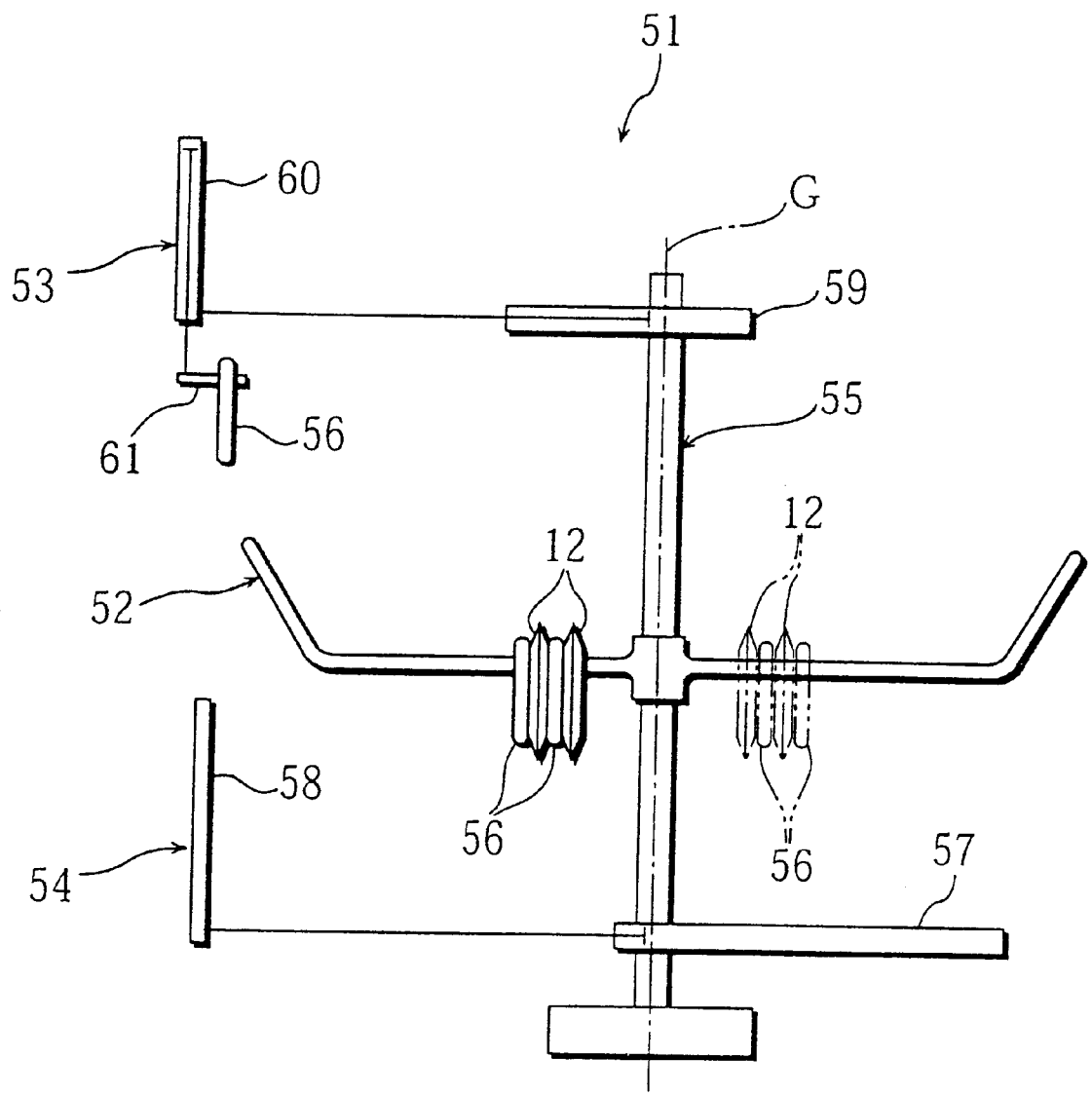
FIG. 14 is a first explanatory view of a bead stock device.

Next, the bead stock device 51 is described in detail. As shown in FIG. 14, the bead stock device 51 is provided with a spacer supplying portion 53 fixed to an upper portion of a vertical pole 55, a stock portion 52 attached to a middle portion of the pole 55 as to rotate around the pole 55 (an axis G), and a pushing portion 54 fixed to a lower portion of the pole 55. And, a middle part of the stock portion 52 is attached to the pole 55 and both ends of the stock portion 52 incline upward.

And, the spacer supplying portion 53 and the pushing portion 54 are disposed on positions not interfering with the transfering device 5 as shown in FIG. 1 through FIG. 3. The stock portion 52, rotating around the axis G, receives the finished bead 12 from the apex fitting device 4, is supplied with a spacer 56 by the spacer supplying portion 53, and the finished bead 12 and the spacer 56 are pressed to the middle part of the stock portion 52 by the pushing portion 54.

Figure 13B:
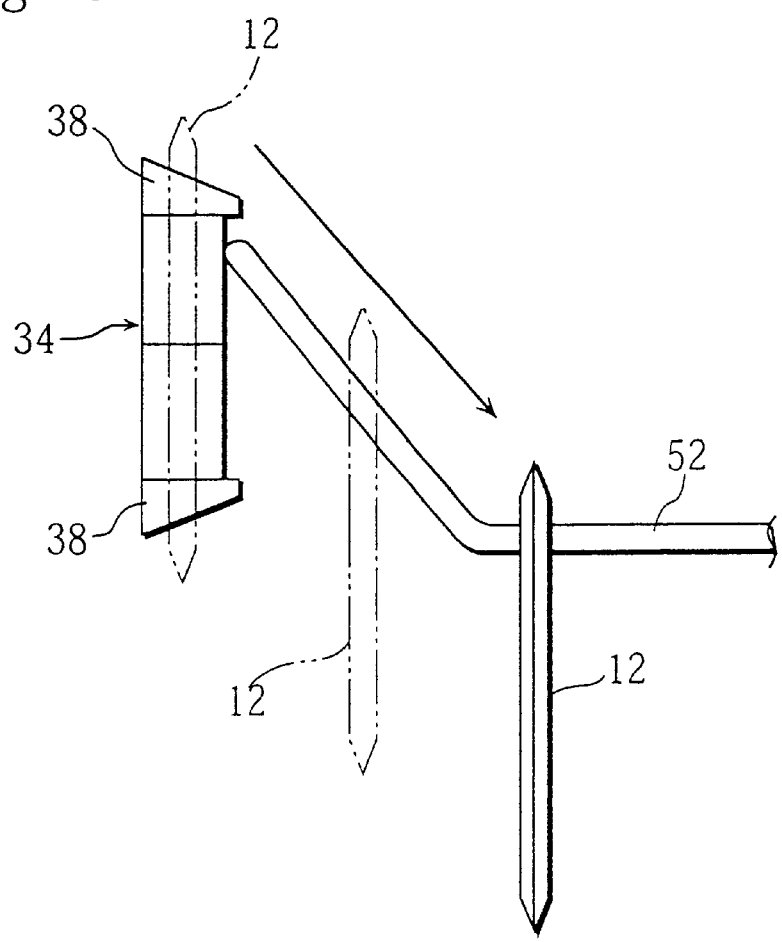
Figure 15A:
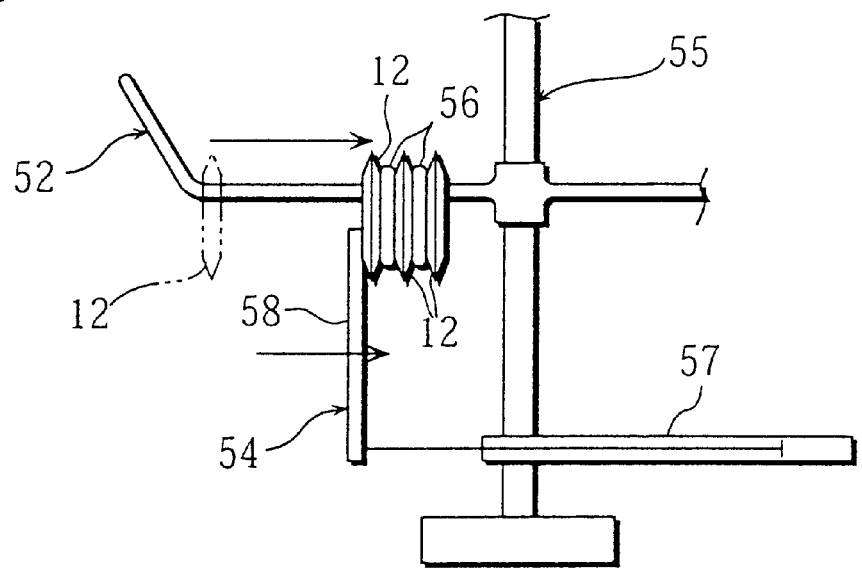
FIG. 15 is a second explanatory view of the bead stock device.
Figure 15B:
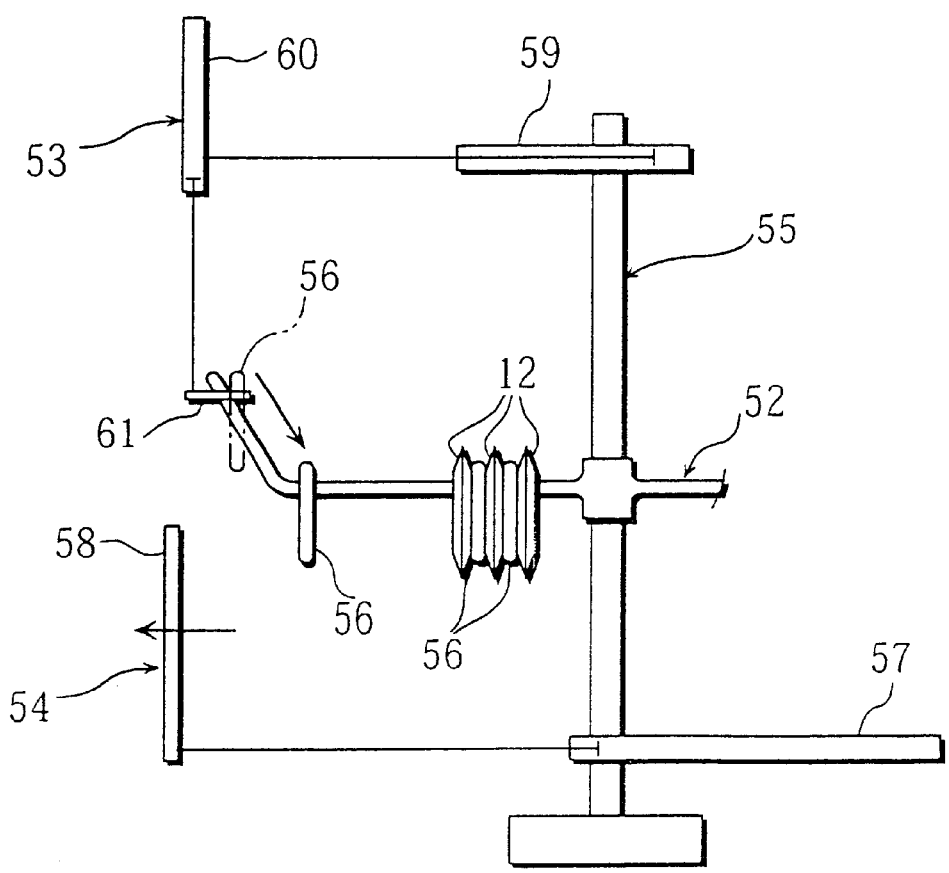

To describe concretely, the stock portion 52, received the finished bead 12 as shown in FIG. 13B, rotates to a position corresponding to the spacer supplying portion 53 and the pushing portion 54 as shown in FIG. 2A. And, a contact portion 58 of the pushing portion 54, closed to the pole 55 by a cylinder 57, pushes the finished bead 12 to the pole 55 as shown in FIG. 15A. Then, as shown in FIG. 15B, the contact portion 58 parts from the pole 55, a provided hitching portion 61 of the spacer supplying portion 53 is closed to an end of the stock portion 52, and the spacer 56 hitched to the hitching portion 61 is transferred to the stock portion 52.

Figure 16:
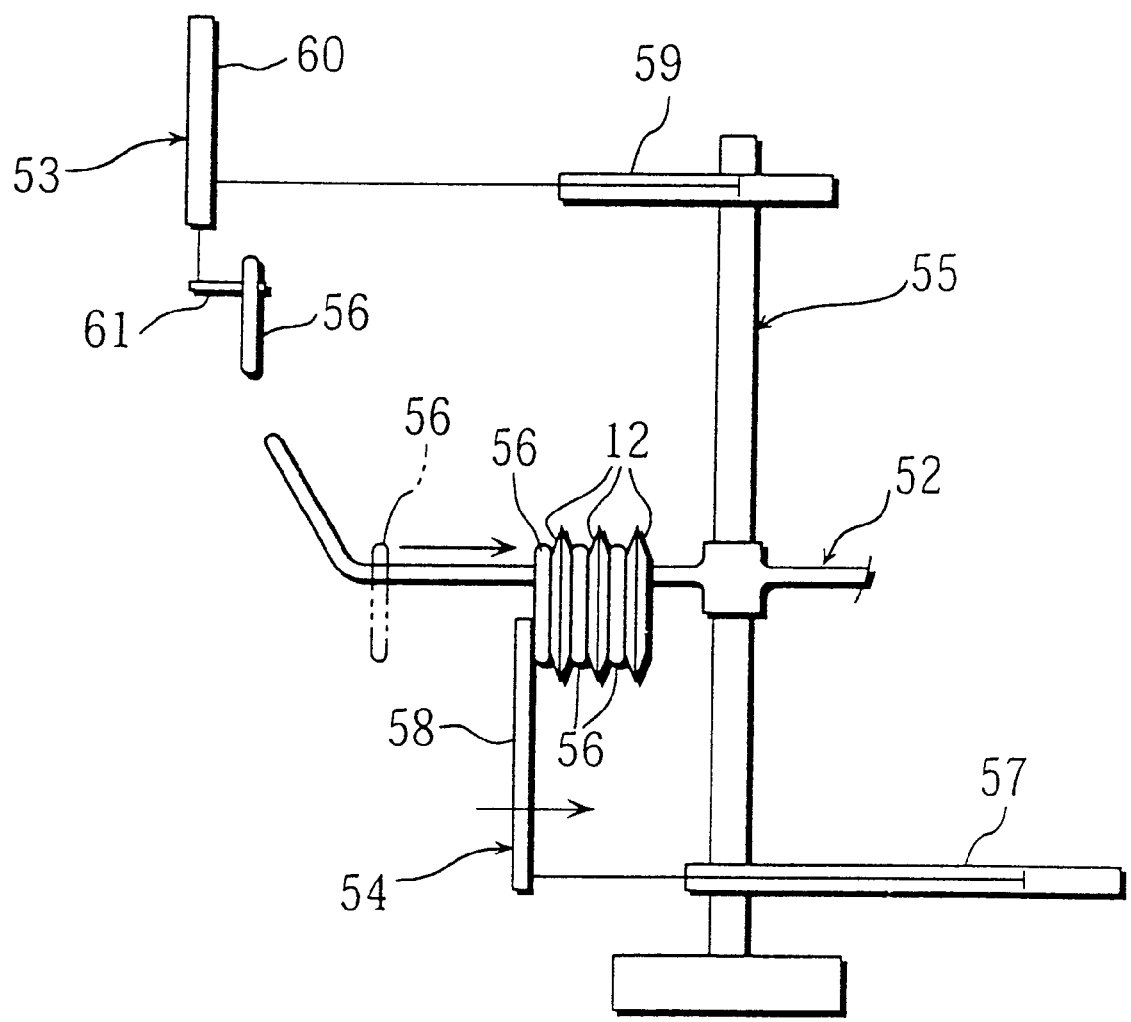
FIG. 16 is a third explanatory view of the bead stock device.

And, as shown in FIG. 16, the hitching portion 61 parts from the stock portion 52, hitches a new spacer 56 and wait. The contact portion 58 approaches the pole 55 and pushes the spacer 56 transferred to the stock portion 52 to the pole 55.

Then, as shown in FIG. 1, the stock portion turns around the axis G, and receives next finished bead 12 again from the apex fitting device 4.

As described above, the finished beads 12 and the spacers 56 are stocked on the stock portion 52 one after the other, and the spacer 56 prevents the finished beads 12 from sticking each other.

And, the stock is efficient because the finished beads 12 and the spacers 56 can be stocked on the both sides of the pole 55 on the stock portion 52.

And, in the present invention, not restricted to the embodiments above, for example, the transfering portion 13 on the upstream side and the transfering portion 13 on the downstream side may move independently to shorten the production time of the bead. And, the number of the contact portion 14 may be increased to conduct the take out and transfering more certainly. That is to say, the design can be modified within the scope of the present invention.

According to the manufacturing apparatus for single-wire bead of the present invention, conventional problems, such as keeping the stock lane, the handling of the bead between the devices, generation of defective product, are solved because the finished bead 12 is made of the wire 6. The finished bead 12 is made efficiently in one production line. Further, only required amount of the product can be made, and improved productivity and cost reduction can be obtained.

And, the finished beads 12 can be stocked efficiently and automatically for the bead stock device 51, and further productivity and cost reduction can be obtained.

While preferred embodiments have been described in this specification, it is to be understood that the invention is illustrative and not restrictive, because various changes are possible within the spirit and indispensable features.

What is claimed is:

1. A manufacturing apparatus for single-wire bead comprising:
    a winding device which forms a formed bead by winding a wire to a drum;
    a thread winding device which forms an intermediate bead by winding and fixing thread to both ends of the wire on approximately same position on circumference of the formed bead;
    an apex fitting device which forms a finished bead by fitting an apex to the intermediate bead; and
    a transfering device, reciprocating between a first position and a second position, which takes the formed bead out of the winding device and the intermediate bead out of the thread winding device on the first position, and transfers the formed bead to the thread winding device and the intermediate bead to the apex fitting device on the second position.

2. The manufacturing apparatus for single-wire bead as set forth in claim 1, wherein a bead stock device, which stocks the finished bead released from the apex fitting device, is provided.

* * * * *